(12) United States Patent
Osthus

(10) Patent No.: US 10,614,081 B2
(45) Date of Patent: Apr. 7, 2020

(54) SOCIAL PERSONALITY PROFILING FOR PRODUCTIVITY ENHANCEMENT

(71) Applicant: Leap Road, Inc., Plantation, FL (US)

(72) Inventor: Torsten Osthus, Roetgen (DE)

(73) Assignee: LEAP ROAD, INC., Plantation, FL (US)

( * ) Notice: Subject to any disclaimer, the term of this patent is extended or adjusted under 35 U.S.C. 154(b) by 196 days.

(21) Appl. No.: 15/834,581

(22) Filed: Dec. 7, 2017

(65) Prior Publication Data

US 2019/0179913 A1    Jun. 13, 2019

(51) Int. Cl.
*G06F 7/00* (2006.01)
*G06F 16/00* (2019.01)
*G06F 16/2457* (2019.01)
*G06F 16/248* (2019.01)
*G06F 16/9535* (2019.01)

(52) U.S. Cl.
CPC ...... *G06F 16/24578* (2019.01); *G06F 16/248* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 2009/0055249 A1* | 2/2009 | Lieberman | ............. | G06Q 30/02 705/7.33 |
| 2011/0093780 A1* | 4/2011 | Dunn | ................. | G06Q 30/0269 715/706 |
| 2011/0250575 A1 | 10/2011 | Kalvachev et al. | | |
| 2012/0311462 A1* | 12/2012 | Devecka | ................. | H04W 4/21 715/753 |
| 2013/0097101 A1* | 4/2013 | Ortiz | ...................... | G06Q 30/02 706/11 |
| 2014/0188681 A1* | 7/2014 | Shahghasemi | ......... | G06Q 20/22 705/37 |

FOREIGN PATENT DOCUMENTS

WO    WO 2010/151700    12/2010

* cited by examiner

*Primary Examiner* — Tuan A Pham
(74) *Attorney, Agent, or Firm* — Steven M. Greenberg, Esq.; Shutts & Bowen LLP

(57) ABSTRACT

A method for social personality profiling for productivity enhancement includes defining a base profile for a subject end user identifying the end user. The method also may include prompting the subject end user to select a multiplicity of listed values defining respectively different ethical human behaviors, and additionally prompting the subject end user to rank a subset of the selected values. The method may yet further include transmitting the selected values to a different end user stored in connection with the subject end user, and receiving from the different end user a different ranked subset of the selected values. Finally, the method may include computing a composite ranked subset from the ranked subsets of the subject end user and different end user, identifying an avatar corresponding to the composite ranked subset and displaying a recommended action mapped in the fixed storage to the identified avatar.

12 Claims, 3 Drawing Sheets

SOCIAL PERSONALITY PROFILING FOR PRODUCTIVITY ENHANCEMENT

BACKGROUND OF THE INVENTION

Field of the Invention

The present invention relates to the field of computer driven personality testing and more particularly to computation of a personality profile for use in goal determination.

Description of the Related Art

Personality testing refers to the administration of a questionnaire or other standardized instrument designed to reveal aspects of the character or psychological makeup of an individual. Personality testing had been developed originally almost a century ago with the intent to ease the process of personnel selection, particularly in the armed forces. Since these early efforts, a wide variety of personality tests have been developed, notably the Myers-Briggs Type Indicator (MBTI), the Minnesota Multiphasic Personality Inventory (MMPI), and a number of tests based on the five factor model of personality, such as the Revised NEO Personality Inventory.

The advent of the personal computer, the global Internet and the World Wide Web has transformed the reach of personality testing from paper based submissions to online data submissions. Consequently, in recent years, the use of computer driven personality testing has exploded in popularity across varies use cases including individual and relationship counseling, career counseling, employment testing, occupational health and safety and customer interaction management. To satisfy these various use cases, several different types of personality tests are employed, including most commonly, the self-report inventory, also referred to as the objective personality test. Self-report inventory tests involve the administration of many questions or statements to test-takers who respond to the question or statement in terms of a rating of agreement. The rating of agreement often is expressed utilizing a Likert scale or, more accurately, a Likert-type scale.

The most widely used objective test of personality is the Minnesota Multiphasic Personality Inventory (MMPI) which was originally designed to distinguish individuals with different psychological problems. Since then, MMPI has become popular as a means of attempting to identify personality characteristics of people in many every-day settings. In addition to self-report inventories, there are many other methods for assessing personality, including observational measures, peer-report studies, and projective tests including the Thematic Apperception Test (TAT) and the ink blot test. Of note, while in the past personality testing has been used to attempt to match particular customers of particular personality types with specific customer service representatives in the context of customer relationship management (CRM), predominantly, personality testing has been employed in the corporate world only in connection with human resources and the hiring and recruitment process.

BRIEF SUMMARY OF THE INVENTION

As described herein, summarily, a method for social personality profiling for productivity enhancement may include defining in fixed storage of a computer by a processor of the computer, a base profile for a subject end user identifying the end user. The method also may include prompting the subject end user in a display of the computer to select a multiplicity of listed values defining respectively different ethical human behaviors, and additionally prompting the subject end user to rank a subset of the selected values. The method may yet further include transmitting the selected values over a computer communications network to a different end user stored in the fixed storage of the computer in connection with the subject end user, and receiving from the different end user from over the network, a different ranked subset of the selected values. Finally, the method may include computing a composite ranked subset from the ranked subsets of the subject end user and different end user, identifying an avatar corresponding to the composite ranked subset and displaying in the display a recommended action mapped in the fixed storage to the identified avatar.

In one aspect of the embodiment, the identified avatar is a probabilistic composition of multiple different avatars. In another aspect of the embodiment, the action is a recommendation to request a social media connection with a particular individual in a social media networking Web site. In this regard, the subject end user may specify a goal as part of the user profile of the subject end user. As such, the action may be a recommendation to establish a social networking connection with another contact who shares the same avatar as the identified avatar and who has achieved a goal similar to specified goal for the subject end user.

In yet another aspect of the embodiment, the action is a sorted ordering of a task list in the fixed storage of the computer. In even yet another aspect of the embodiment, the action is an addition of a task to a task list in the fixed storage of the computer. Finally, in an aspect of the embodiment, the method further includes publishing the avatar in an address book module of a computer program as part of a user profile for the subject end user.

In another embodiment of the invention, a data processing system is configured for social personality profiling for productivity enhancement. The system includes a computer with a display, memory, fixed storage and at least one processor. The system also includes a social personality profiling module executing in the memory of the computer. The module includes computer program instructions executing in the memory by the at least one processor to perform defining in the fixed storage a base profile for a subject end user identifying the end user, prompting the subject end user in the display of the computer to select a multiplicity of listed values defining respectively different ethical human behaviors, additionally prompting the subject end user to rank a subset of the selected values, transmitting the selected values over a computer communications network to a different end user stored in the fixed storage of the computer in connection with the subject end user, and receiving from the different end user from over the network, a different ranked subset of the selected values, computing a composite ranked subset from the ranked subsets of the subject end user and different end user, identifying an avatar corresponding to the composite ranked subset and displaying in the display a recommended action mapped in the fixed storage to the identified avatar.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for social personality profiling for productivity enhancement. In accordance with an embodiment of the invention, a subject end user establishes a base profile defining a basic identity of the subject end user. Thereafter, the subject end user selects a multiplicity of different values corresponding to different ethical codes of behavior of a human being, in response to which the subject end user ranks a subset of the selected values from most important to least important. The selected values are then provided to one or more individuals in a social network of the subject end user and the individuals, like the subject end user, applying a ranking to a top five subset of the selected values. A composite of the top five subsets from the subject end user and the one or more individuals is then produced and used to generate a resultant avatar from a pool of avatars, each reflecting a social personality profile specific to the base profile of the subject end user. The avatar then maps to one or more action recommendations presented to the subject end user, for instance a recommendation to order the performance of different tasks is a task list for the subject end user, to connect in a social network to one or more different individuals not connected to the subject end user, or to add one or more new tasks to the task list for the subject end user.

Figure 1:
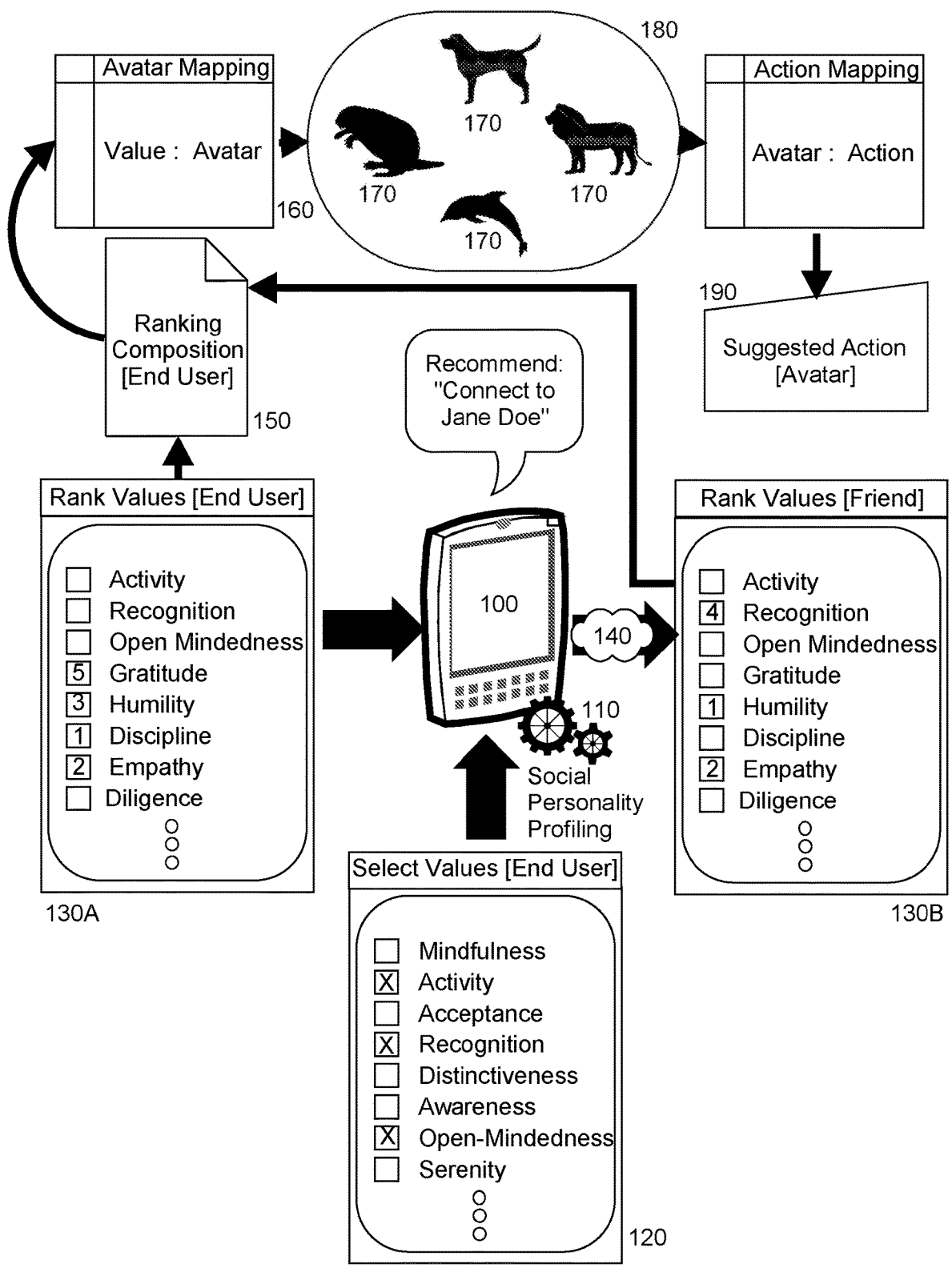
FIG. 1 is pictorial illustration of a process for social personality profiling for productivity enhancement.

In further illustration, FIG. 1 is pictorial illustration of a process for social personality profiling for productivity enhancement. As shown in FIG. 1, a social personality profiling computer program 110 executes in the memory of a computing device 100 and presents in a display of the computing device 100, a listing of values of ethical human behavior 120. An end user selects different ones of the values in the listing 120 in response to which the computer program 110 presents to the end user in a prompt 130A, a request to rank in order of most important to least important, only a subset of the values selected in the listing of values of ethical human behavior 120. As well, the computer program 110 transmits of the Internet 140 to at least one contact of the end user, the values selected in the listing of values of ethical human behavior 120.

To that end, in a computing device (not shown) of the contact, a request is presented in a prompt 130B to rank in order of most important to least important from the perspective of the end user, only a subset of the values selected in the listing of values of ethical human behavior 120, in so far as the contact in doing so estimates the belief system of the end user. Consequently, the social personality profiling computer program 110 generates a composition of the rankings 150 based upon the ranking of the subset of the values received from the prompt 130A, and also one or more rankings of the subset of the values received from the prompt 130B of each contact of the end user. For instance, the composition of the rankings 150 may be a frequency distribution of the values in the subset or a frequency distribution of the rankings of the values in the subset, to name two possibilities.

Of note, the social personality profiling computer program 110 may then map the composition of the rankings 150 to an avatar mapping 160 of values to ones of the avatars 170 in order to identify a particular one of the avatars 170 correspondent with the rankings. In this regard, the avatar mapping 160 may contain a set of tuples matching specific values to to specific ones of the avatars 170 so that a single one of the avatars 170 is selected based upon a most frequently mapped one of the avatars 170 to corresponding ones of the values in the composition of the rankings 150. Or, a set of the avatars 170 may be produced with each of the avatars 170 in the set indicating a percentage of time in which each of the avatars 170 maps to the values of the composition of the rankings 150.

Finally, the social personality profiling computer program 110 maps the selected one of the avatars 170 or selected set of avatars 170 in an action mapping 180 relating different ones of the avatars 170 to different computing actions. The computing actions, may include, for example, the suggestion that the end user establish a social media connection with another contact or a contact of a particular role. As well, the actions may include sending a message to another contact, or scheduling a meeting or task. Even further, the actions may include the presentation of a message box or dialog box in a user interface in a display of the computing device 100 recommending that the end user complete a task associated with one open window of the user interface responsive to the end user attempting to toggle to a different window of the user interface, or responsive to the end user attempting to launch a new window in the user interface. Even yet further, the actions may include the presentation of a message box or dialog box in the user recommending that the end user complete a task presently selected in a task list responsive to the end user attempting to select a different task in the task list, or responsive to the end user attempting to create a new task in the task list.

The mapping by the computer program 110 produces at least one suggested action 190 which then, in turn, is displayed in the display of the computing device 100. The mapping by the computer program 110 also may produce a recommendation to establish a social networking connection with another contact who shares the same avatar and who has achieved a goal similar to a goal specified by the end user. Optionally, the social personality profiling computer program 110 publishes the selected one of the avatars 170 or selected set of avatars 170 for processing in a different computing device in connection with contact information for the end user in the different computing device.

Figure 2:
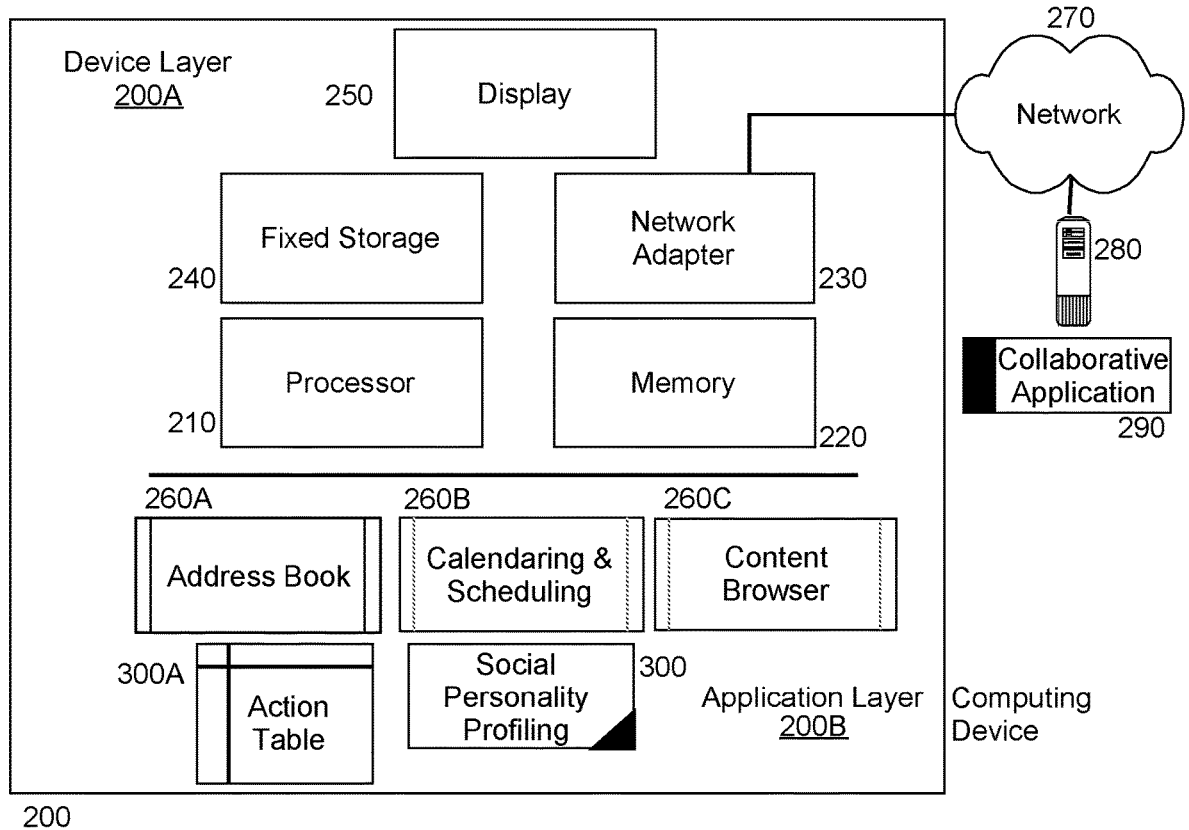
FIG. 2 is a schematic illustration of a data processing system adapted for social personality profiling for productivity enhancement.

The process described in connection with FIG. 1 may be implemented in a computer data processing system. In further illustration, FIG. 2 schematically shows a data processing system adapted for social personality profiling for productivity enhancement. The system includes a computing device 200 that has both a device layer 200A and also an application layer 200B. The device layer 200A includes at least one processor 210, memory 220, a network adapter 230 and fixed storage 240, as well as a display 250. The application layer, in turn, includes an address book program module 260A, a calendaring and scheduling program module 260B and a content browser 260C. Of import, a social personality profiling program module 300 is programmatically coupled to each of the address book program module 260A, calendaring and scheduling program module 260B and content browser 260C, and also to an action table 300A populated with different actions corresponding to different avatars. The different actions are sourced from different end users utilizing the collaborative application 290 observed programmatically to have completed different tasks in association with monitored user interface interactions such that one or more of the user interactions are determined to an action requisite to achieving a corresponding one of the tasks.

The social personality profiling module 300 includes program code enabled upon execution in the memory 220 by the processor 210 to load into memory a set of values and to display the same in the display 250 for selection by the end user. The program code is further enabled to prompt the end user to rank a subset of the values in the set selected by the end user. Even further, the program code is enabled to transmit over the Internet, the selected ones of the values to at least one different individual associated with the end user by way of the address book program module 260A, the calendaring and scheduling module 260B, or a social media Web site accessible through the content browser module 260C. Even yet further, the program code is enable to provoke the prompting by the at least one different individual to applying a rank ordering of a subset of the values in the set selected by the end user.

Importantly, the program code of the social personality profiling module 300 is enabled upon execution by a processor 210 of the computing device 200 to composite the rank ordering of the end user with that of each other different individual. Consequently, the program code is enabled to identify one or more avatars mapping to the composite rank ordering and to map one or more actions to the identified avatar or avatars. Finally, the program code of the social personality profiling module 300 is enabled upon execution by the processor 210 to display the mapped action or actions in the display 250 of the computing device 200. Optionally, the program code of the social personality profiling module 300 may transmit the identified one or more avatars to a third party over the Internet, along with a textual explanation of the relevance of the identified one or more avatars.

Figure 3:
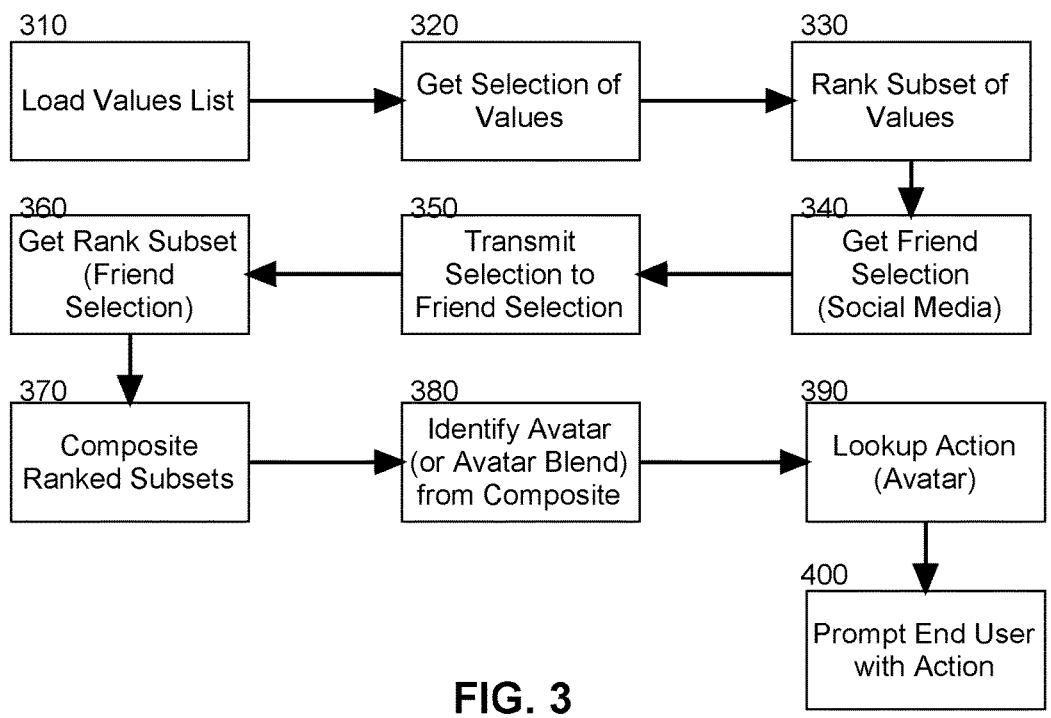
FIG. 3 is a flow chart illustrating a process for social personality profiling for productivity enhancement; and, FIG. 4 is a flow chart illustrating a process for triggering avatar correspondent actions in an action table based upon recognized events in a user interface correspondent to a social personality profiled avatar of an end user.

In even yet further illustration of the operation of the social personality profiling module 300, FIG. 3 is a flow chart illustrating a process for social personality profiling for productivity enhancement. Beginning in block 310, a values list of ethical behaviors is loaded into memory and presented in a dialog box or Web page of a user interface in which the end user, in block 320, may select different ones of the values deemed most important to the end user. In block 330, the end user is prompted to rank only a subset of the values selected by the end user in order of subjective importance to the end user. As well, in block 340, one or more social media contacts or address book contacts of the end user are identified and in block 350, the values selected by the end user are transmitted over the Internet to the one or more social media contacts or address book contacts.

In block 360, a ranked order of a subset of the selected values is received from each of the different end users and in block 370, the ranked order of each subset from each of the different users are composited with the ranked order of the end user in order to produce a composite ranked subset of values. Thereafter, in block 380, an avatar or a set of avatars are identified in a table as having been mapped to one or more of the values in the composite ranked subset and weighted according an association with a higher or lower ranked one of the values and a frequency in which an associated one of the values appears in the composite ranked subset. Finally, in block 390 an action is identified that corresponds to the avatar or set of avatars and in block 400, the end user is prompted to perform the action.

Figure 4:
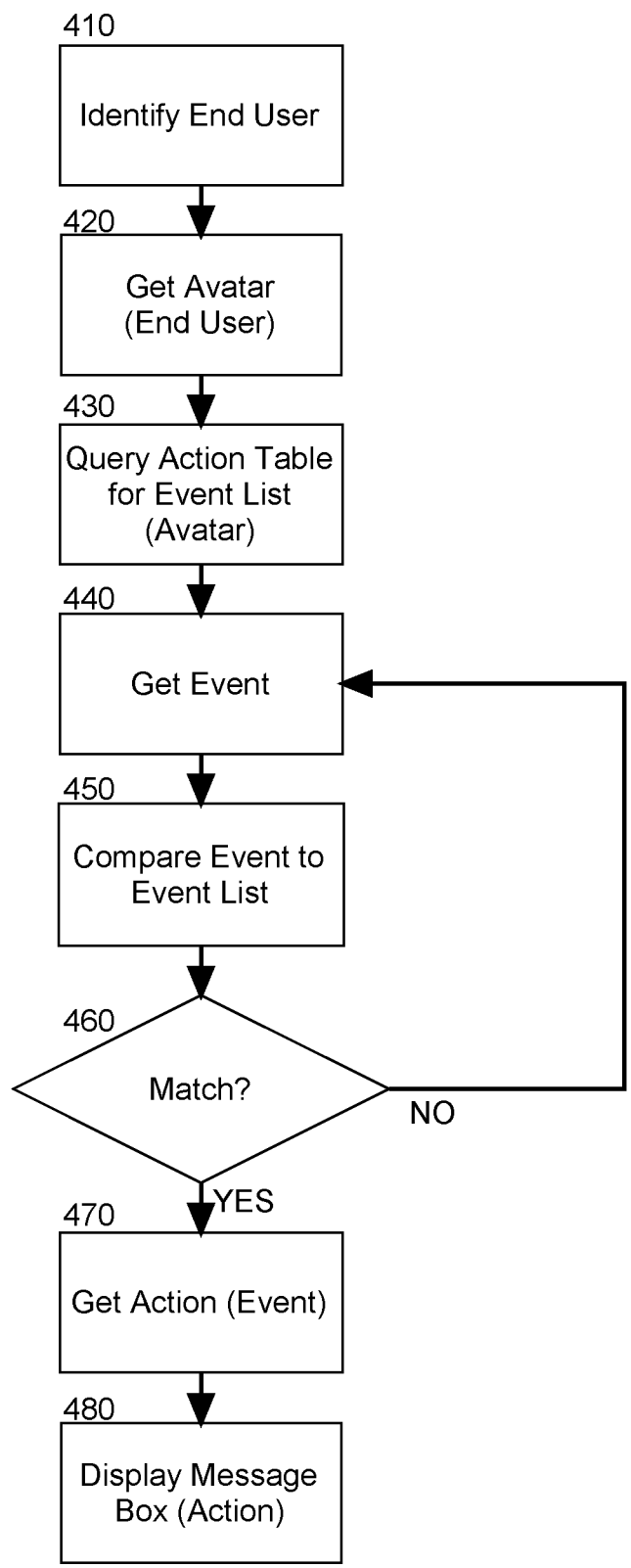

Of note, the action for which the user is prompted may be determined based upon a contemporaneous event occurring in the user interface. More particularly, FIG. 4 is a flow chart illustrating a process for triggering avatar correspondent actions in an action table based upon recognized events in a user interface correspondent to a social personality profiled avatar of an end user. As shown in FIG. 4, in block 410, an end user is first identified and then in block 420, an avatar determined according to social personality profiling is retrieved for the end user. In block 430, an action table is queried for the avatar in order to select a list of events for which actions are to be suggested in the user interface based upon the avatar of the end user.

Then, in block 440, an event is received. In block 450, the received event is compared to those of the list of events to determine if a correspondent action is available. In decision block 460, if it is determined that a correspondent action is available, in block 470 the correspondent action is retrieved for the event and in block 480, the correspondent action is displayed in a message box or dialog box. It bears noting that the actions of the action table may include actions sourced from different end users observed programmatically to have completed different tasks in association with monitored user interface interactions such that one or more of the user interactions are determined to an action requisite to achieving a corresponding one of the tasks. The events, in turn, may be related to the corresponding tasks so that the actions determined to have been successful for others in completing a particular task may be conveyed in a prompt when it is determined that the end user also attempts to complete the same or similar task.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for social personality profiling for productivity enhancement, the method comprising:
    defining in fixed storage of a computer by a processor of the computer, a base profile for a subject end user identifying the end user;
    prompting the subject end user in a display of the computer to select a multiplicity of listed values defining respectively different ethical human behaviors;
    additionally prompting the subject end user to rank a subset of the selected values from most important to least important from a perspective of the end user;
    transmitting the selected values over a computer communications network to a different end user, and receiving from the different end user from over the network, a different ranked subset of the selected values;
    computing a composite ranked subset from the ranked subsets of the subject end user and different end user;
    identifying an avatar corresponding to the composite ranked subset and that is a probabilistic composition of multiple different avatars;
    displaying in the display a recommended computing action mapped in the fixed storage to the identified avatar; and,
    specifying a goal for the subject end user as part of the user profile of the subject end user, wherein the action is a recommendation to establish a social networking connection with another contact who shares the same avatar as the identified avatar and who has achieved a goal similar to specified goal for the subject end user; and
    publishing the avatar in an address book module of a computer program as part of a user profile for the subject end user.

2. The method of claim 1, wherein the action is a recommendation to request a social media connection with a particular individual in a social media networking Web site.

3. The method of claim 1, wherein the action is a sorted ordering of a task list in the fixed storage of the computer.

4. The method of claim 1, wherein the action is an addition of a task to a task list in the fixed storage of the computer.

5. A data processing system configured for social personality profiling for productivity enhancement, the system comprising:
- a computer with a display, memory, fixed storage and at least one processor; and,
- social personality profiling module executing in the memory of the computer, the module comprising computer program instructions executing in the memory by the at least one processor to perform:
- defining in fixed storage of a computer by a processor of the computer, a base profile for a subject end user identifying the end user;
- prompting the subject end user in a display of the computer to select a multiplicity of listed values defining respectively different ethical human behaviors;
- additionally prompting the subject end user to rank a subset of the selected values from most important to least important from a perspective of the end user;
- transmitting the selected values over a computer communications network to a different end user, and receiving from the different end user from over the network, a different ranked subset of the selected values;
- computing a composite ranked subset from the ranked subsets of the subject end user and different end user;
- identifying an avatar corresponding to the composite ranked subset and that is a probabilistic composition of multiple different avatars;
- displaying in the display a recommended computing action mapped in the fixed storage to the identified avatar; and,
- specifying a goal for the subject end user as part of the user profile of the subject end user, wherein the action is a recommendation to establish a social networking connection with another contact who shares the same avatar as the identified avatar and who has achieved a goal similar to specified goal for the subject end user; and
- publishing the avatar in an address book module of a computer program as part of a user profile for the subject end user.

6. The system of claim 5, wherein the action is a recommendation to request a social media connection with a particular individual in a social media networking Web site.

7. The system of claim 5, wherein the action is a sorted ordering of a task list in the fixed storage of the computer.

8. The system of claim 5, wherein the action is an addition of a task to a task list in the fixed storage of the computer.

9. A computer program product for social personality profiling for productivity enhancement, the computer program product including a non-transitory computer readable storage medium having program instructions embodied therewith, the program instructions executable by a device to cause the device to perform a method including:
- defining in fixed storage of a computer by a processor of the computer, a base profile for a subject end user identifying the end user;
- prompting the subject end user in a display of the computer to select a multiplicity of listed values defining respectively different ethical human behaviors;
- additionally prompting the subject end user to rank a subset of the selected values from most important to least important from a perspective of the end user;
- transmitting the selected values over a computer communications network to a different end user, and receiving from the different end user from over the network, a different ranked subset of the selected values;
- computing a composite ranked subset from the ranked subsets of the subject end user and different end user;
- identifying an avatar corresponding to the composite ranked subset and that is a probabilistic composition of multiple different avatars;
- displaying in the display a recommended computing action mapped in the fixed storage to the identified avatar; and,
- specifying a goal for the subject end user as part of the user profile of the subject end user, wherein the action is a recommendation to establish a social networking connection with another contact who shares the same avatar as the identified avatar and who has achieved a goal similar to specified goal for the subject end user; and
- publishing the avatar in an address book module of a computer program as part of a user profile for the subject end user.

10. The computer program product of claim 9, wherein the action is a recommendation to request a social media connection with a particular individual in a social media networking Web site.

11. The computer program product of claim 9, wherein the action is a sorted ordering of a task list in the fixed storage of the computer.

12. The computer program product of claim 9, wherein the action is an addition of a task to a task list in the fixed storage of the computer.

* * * * *